UNITED STATES PATENT OFFICE.

WILHELM STERNBERG, OF BERLIN, GERMANY, ASSIGNOR TO CHEMISCHE FABRIK AUF ACTIEN, (VORM. E. SCHERING,) OF BERLIN, GERMANY.

DIMETHYLENE TARTRATE AND METHOD OF MAKING SAME.

SPECIFICATION forming part of Letters Patent No. 699,423, dated May 6, 1902.

Application filed October 29, 1901. Serial No. 80,450. (No specimens.)

*To all whom it may concern:*

Be it known that I, WILHELM STERNBERG, chemist, doctor of philosophy, a subject of the Emperor of Germany, residing at Berlin, Kingdom of Prussia, German Empire, have invented a new and useful Improvement in Dimethylene Tartrate and Method of Making the Same, of which the following is a specification.

My invention relates to the manufacture of the hitherto-unknown dimethylene tartrate, (dimethylene ester of tartaric acid,) which is of use in medicine.

Tollens (see Liebig's *Annalen,* 292, pages 53 and 54) tried to condense tartaric acid with formic aldehyde, using hydrochloric acid. He did not, however, make the compound hereinafter described.

If in place of hydrochloric acid other agents of condensation be used, which at the same time withdraw water—such as sulfuric acid or phosphorous pentoxid and the like—the dimethylene ester of tartaric acid is produced, which has nothing in common with the problematical body described by Tollens.

Methylene tartrate is useful for the disinfection of the urinary passages and is preferably administered in doses of about 0.1 to 0.25 grams three times daily.

To manufacture the compound, one proceeds, for example, as follows: Seven kilograms of tartaric acid are heated with three kilograms of polymeric formaldehyde (paraformaldehyde, trioxymethylene) or the corresponding quantity of a forty-per-cent. solution of formic aldehyde to from 140° to 150° centigrade until a clear solution is produced. The product of reaction is mixed when at about 60° centigrade with fifteen kilograms of sulfuric acid. As heat is evolved it is preferable, in order to prevent a possible carbonization of the mass, not to allow the temperature to exceed 80° centigrade. The syrup when thoroughly cool is then mixed with ice, whereupon the compound separates out and is filtered and washed with water.

In place of sulfuric acid other suitable agents of condensation—such as, for example, phosphorous pentoxid—may be employed.

Dimethylene tartrate forms fine needles, which melt at 120° centigrade without decomposition. It is easily soluble in warm water, with decomposition, however, formic aldehyde being split off. It is easily soluble in alcohol, acetone, and chloroform and can be crystallized out of the same. It is unstable at the blood temperature in the presence of a weak solution of soda. It is even more unstable in the presence of caustic alkalies. On the other hand, it is more stable in the presence of acids.

I claim as my invention—

1. The herein-described process of manufacturing dimethylene tartrate, which consists in causing formaldehyde to react upon tartaric acid in the presence of a condensing agent which at the same time withdraws water, and isolating the resulting product, substantially as set forth.

2. As a new product the herein-described dimethylene tartrate forming fine needles which melt at 120° centigrade, being easily soluble in alcohol, acetone and chloroform, substantially as set forth.

In testimony whereof I have signed my name to this specification in the presence of two subscribing witnesses.

WILHELM STERNBERG.

Witnesses:
    WOLDEMAR HAUPT,
    HENRY HASPER.